UNITED STATES PATENT OFFICE.

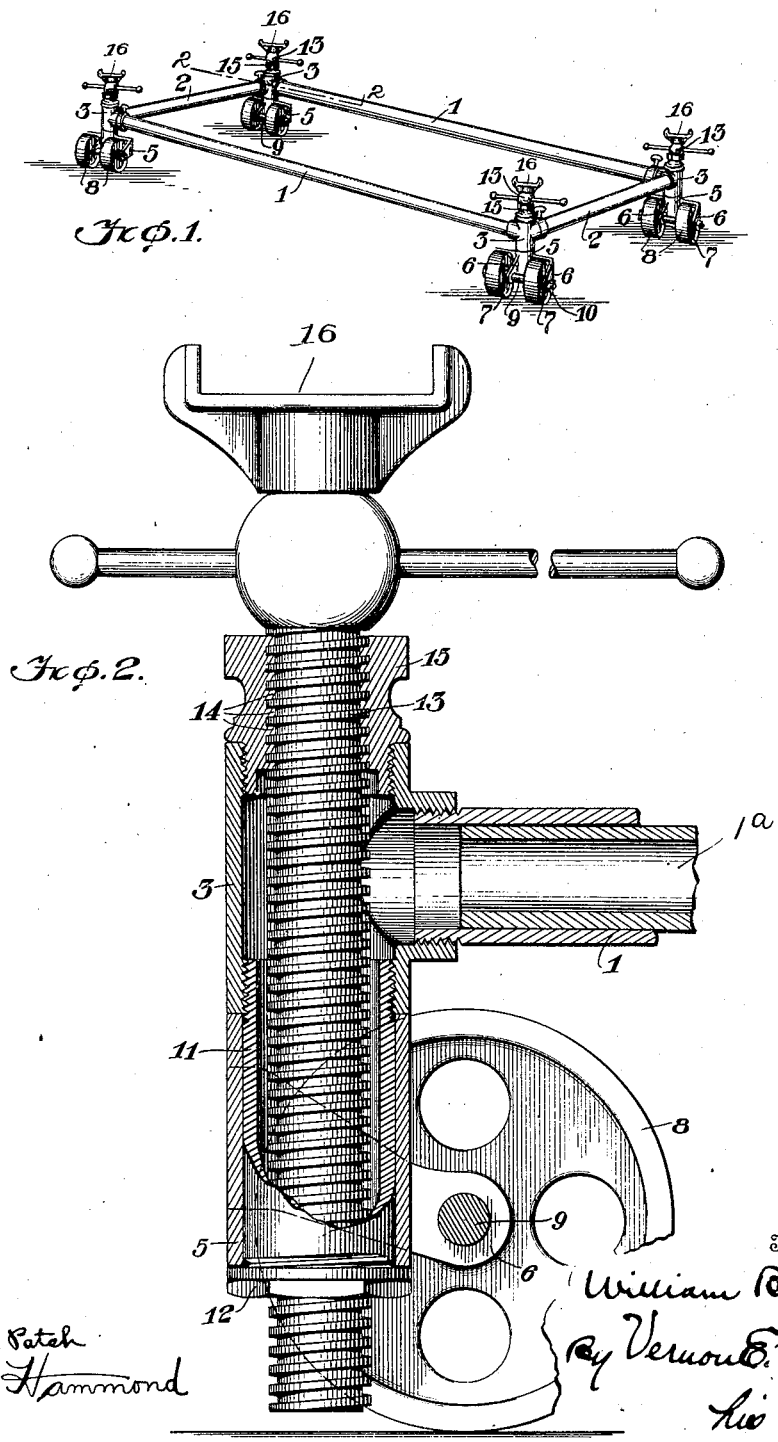

WILLIAM BECKERT, OF ALLEGHENY, PENNSYLVANIA.

COMBINED JACK AND TRUCK.

968,315.

Specification of Letters Patent.   Patented Aug. 23, 1910.

Application filed April 14, 1909.   Serial No. 489,923.

*To all whom it may concern:*

Be it known that I, WILLIAM BECKERT, a citizen of the United States, residing at Allegheny, in the county of Allegheny and State of Pennsylvania, have invented certain new and useful Improvements in Combined Jacks and Trucks, of which the following is a specification.

My invention relates to an improvement in combined jacks and trucks, and relates more particularly to the type of device disclosed in Letters Patent, No. 386,913, and No. 493,811, granted to me July 31, 1888 and March 21, 1893, respectively, the especial object of the present improvement being to provide and adapt a truck for low-wheeled vehicles, such as automobiles the axles of many of which are not over nine and a half inches from the ground.

In the accompanying drawings:—Figure 1 is a view in perspective, and Fig. 2 is an enlarged sectional view through one of the jacks, on line 2—2 of Fig. 1, which is in a vertical plane coincident with the center of tube 1.

In my present invention, the frame is adjustable as to length and width, and adapted to support both axles, it being preferably made of the telescopic tubular sides 1, 1ª, and ends 2, 2. These are screwed into the side outlet tees 3, 3, which constitute the corners of the frame.

The numeral 5 represents a caster frame which comprises a hollow center, and the side leaves 6, 6, having orifices 7, 7, therein, between which the caster wheels 8, 8, are placed, they being supported on the common journal 9 which is held in place by a nut 10 screwed on the end thereof. The caster frame is loosely mounted on a hollow or tubular post 11, the upper end of which is screwed into the lower end of the tee, where it is held by a lock nut 12 screwed on the lower end of the hollow post.

A screw jack 13 turns in the internal threads 14 of the polygonal head 15, which head really constitutes an extension of the corner tee and post, the entire construction being hollow from top to bottom, this being a feature of the invention, and admitting of the screw jack being screwed down to the floor to get it to the lowest possible point to accommodate the lowest possible axle. Each jack is provided with the usual saddle 16 at the top to receive and support the axle, as the jack is adjusted up and down to raise the vehicle from the floor, and to throw its weight upon the truck.

From the foregoing it will be seen that I have provided a combined jack and truck for the support of both front and rear axle, the parts of which are mounted at a minimum elevation from the floor, so that the device may be run beneath the axles and adjusted as to length and width, and the jacks lowered sufficiently to clear the lowest axle in placing the truck, after which they are raised to lift the wheels of the vehicle from the ground or floor to support the vehicle gear sufficiently high to receive the wheels.

Having fully described my invention, what I claim as new and desire to secure by Letters Patent, is:—

1. A device of the character described, the frame of which comprises sides, ends, and outlet tees which connect said sides and ends together and form the corners of the frame, a head surmounting each tee, the bores of which are screw-threaded, and screw-jacks, the threads of which turn in the threads of the heads, a caster frame rotatably connected with each tee, and each caster frame provided with leaves which extend laterally, and journals extending through the leaves at one side of the caster frame and out of the paths of the screw-jacks, and a caster wheel mounted on each journal whereby each screw may be lowered to a point below the axle of the adjacent caster wheel.

2. A screw jack for rolling trucks comprising a hollow post, a side outlet tee to which the hollow post is secured, an internally-threaded head secured to the upper end of the tee, a jack proper screwed to the internal threads of the head, a caster frame journaled on the post, caster wheels journaled in the frame at opposite sides of the post, and a lock nut for retaining the caster frame on the lower end of the post.

In testimony whereof I affix my signature, in the presence of two witnesses.

WM. BECKERT.

Witnesses:
 C. A. NEALE,
 VERNON E. HODGES.